United States Patent Office 2,906,929
Patented Sept. 29, 1959

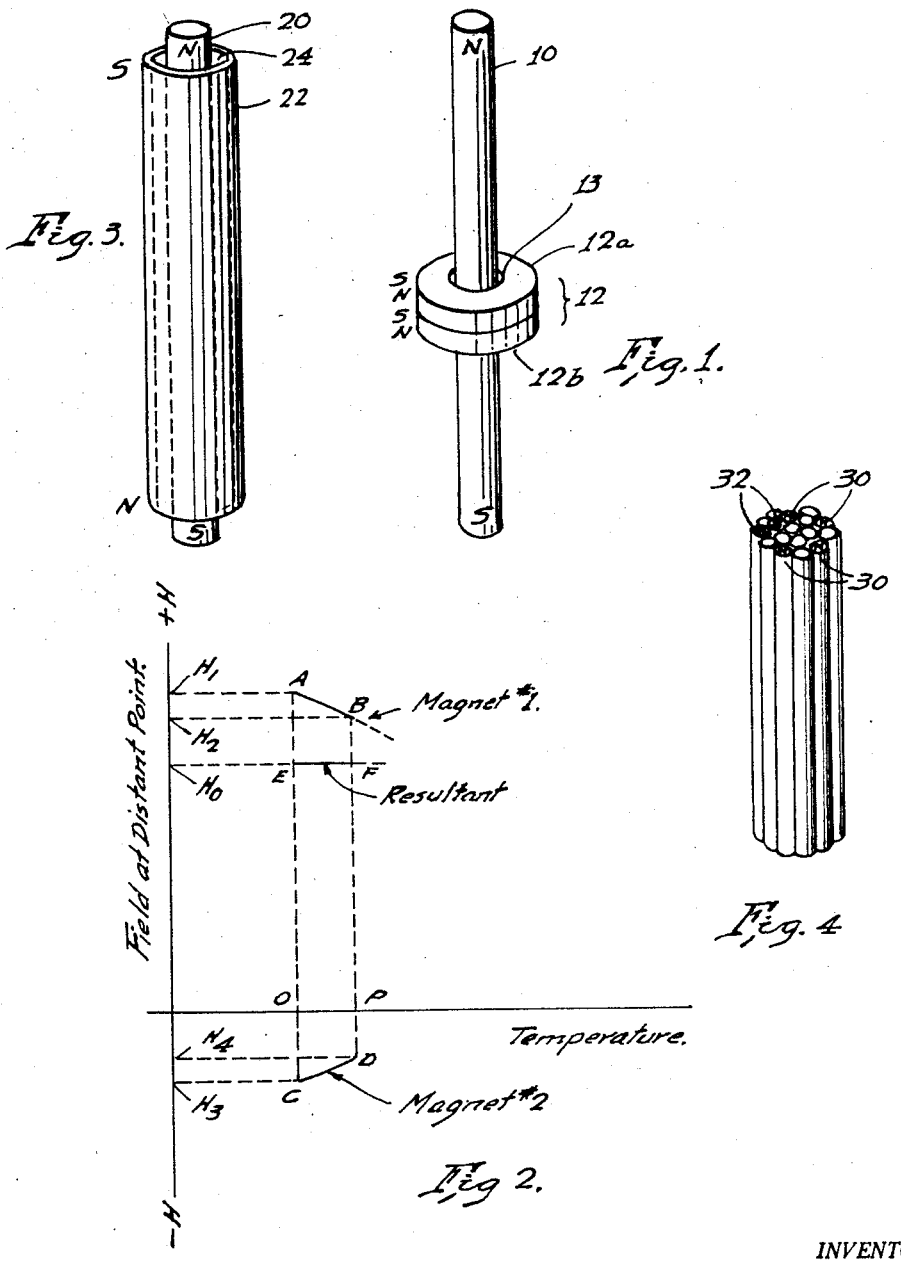

2,906,929

TEMPERATURE COMPENSATED PERMANENT MAGNET

Ralph D. Wyckoff, Pittsburgh, Pa., assignor to Gulf Research & Development Company, Pittsburgh, Pa., a corporation of Delaware Application May 28, 1954, Serial No. 433,063

13 Claims. (Cl. 317—201)

This invention concerns a temperature-compensated permanent-magnet system and in particular concerns a magnet system whose effect at a distance is substantially free of any change with temperature.

There are many applications of permanent magnets in which the field at some distance from the permanent magnet system is employed, this usually being for purposes of magnetic measurements or magnetic compensation. For example in many magnetic instruments, such as magnetometers and the like, the ambient field is compensated either wholly or in part by the field of an auxiliary permanent magnet which may be calibrated as to distance, angle, etc. Such compensating magnets have been found superior to current-carrying coils due to their higher degree of precision and greater convenience. Permanent magnets are also customarily used to compensate a magnetic compass for stray magnetic fields arising from magnetization of surrounding structures such as ships' equipment, airplane engines, etc.

While permanent magnets have been eminently successful for this purpose, there remains one difficulty of permanent magnets which this invention is directed to overcome. This difficulty results from the temperature coefficient of the magnetic moment of the magnet. For example, a magnet which may be used to compensate the earth's field will have a magnetic moment which decreases with temperature. This effect is well known and in the prior art has usually been compensated by supporting the magnet or an associated structure on a mechanical system which expands or contracts with temperature by an amount such that the variation in magnetic field due to change in distance or length more or less exactly counterbalances the variation in magnetic field due to change in magnetic moment of the magnet.

For example, in the well-known Schmidt-type of magnetic balance commonly used as a vertical field magnetometer, and shown for example in Ruska Patent 2,501,538, a pair of magnets are horizontally supported on a quartz knife edge. The magnet system tends to tip due to action of the vertical component of the earth's magnetic field on the magnet system. The tendency to tip is counteracted by means of one or more balance weights arranged to produce an opposing torque about the knife edge due to the action of gravity on the weights. In order to compensate for the inherent temperature variation in magnetic moment of the magnet itself, the counterweights are suspended on material which has the proper temperature coefficient of expansion so that the gravity-force couple varies with temperature in the same way as the magnetic moment of the magnet. Thus, the temperature variation in magnetic moment is compensated by a corresponding change in gravity moment.

It is also known to neutralize part of the vertical component of the earth's field measured with a Schmidt balance by means of a permanent magnet mounted below the balance on a depending calibrated scale arm from which the distance of the neutralizing magnet below the balance may be read. When such a magnet is used the temperature variation of magnetic moment of this magnet affects the reading of the balance. While the temperature effect of this magnet may also be compensated by some mechanical-expansion means, such means is generally cumbersome and the compensation is not exact. Computed corrections may be made but these are time consuming and inaccurate. Such temperature error can be overcome by the use of this invention.

It is also known to operate the Schmidt balance as a null instrument. In this case the vertical component of the earth's field is neutralized entirely by the above-mentioned depending magnet. The distance of the neutralizing magnet for a null reading of the balance is taken as a measure of the field component. When employed in this way it is apparent that temperature variations in the magnetic moment of the neutralizing magnet affect the reading and must be compensated in some manner. The need for such compensation becomes even more important when the balance is replaced by a more sensitive null detector such as a flux valve. Other applications of such a permanent neutralizing magnet arise in the control of the magnetic field of magnetrons, meters, magnetometers, compasses, etc. and in all these applications independence of temperature is an important desideratum.

This invention concerns a permanent magnet system which is compensated for temperature variation of magnetic moment so that its magnetic field at a distance is substantially independent of temperature.

It is accordingly an object of this invention to provide a temperature-compensated permanent magnet system.

It is a further object of this invention to provide a permanent magnet system which is substantially free of temperature variation of its magnetic moment as observed at a distance.

It is a still further object of this invention to provide a permanent magnet system whose magnetic field at a distance is substantially free of any variation due to temperature changes of the magnet system.

It is a still further object of this invention to provide a permanent magnet system whose temperature coefficient of magnetic moment may be made to have a predetermined value.

These and other useful objects of the invention are attained in the manner herein described. Reference may be had to the accompanying drawing in which Figure 1 is a diagram of a preferred embodiment of this invention;

Figure 2 is a graph of the magnetic field due to the temperature-compensated magnet of this invention and illustrates the manner in which the temperature compensation is effected;

Figure 3 is a diagram of another embodiment of the invention; and

Figure 4 is a diagram of still another embodiment of the invention.

Referring to Figure 1, the central elongate member 10 comprises a magnetized rod or bar of permanent magnet material. The term bar magnet as used herein is meant to include any permanent magnet whose poles lie along a rectilinear axis through the magnet material, and such bar magnet may be either long or short. This material may have ordinary permanent magnet characteristics, but preferably should have a low value of temperature coefficient of magnetic moment. The magnet 10 is herein termed the primary magnet, and by making it of material having a reasonably low temperature coefficient, it becomes necessary to provide only reasonable temperature compensation. The primary magnet 10 may, for example, be made of Alnico (a well-known series of magnetic alloys of aluminum, nickel, and iron sometimes also containing cobalt and copper) and have a temperature coefficient of $-3 \times 10^{-4}$ per degree centigrade. This means that its field at a distance decreases 3 parts in 10,000 for each degree centigrade of temperature rise. The primary magnet 10 may have any suitable dimensions for the particular application in which it is to be used, since in certain applications short magnets are desirable and in other applications long magnets are more desirable. It is well known that the permanent magnet 10 when used alone as a compensating magnet would produce a field which varies with temperature in proportion to the change in magnetic moment of the magnet 10 with temperature. The variation in field of the magnet 10 alone is plotted in Figure 2 as the line A—B showing a small decrease in the field from the value $H_1$ to the value $H_2$ when the temperature changes from the temperature O to the temperature P.

According to this invention there is associated with the primary magnet 10, a secondary magnet 12 which is made of a magnetic material having preferably a much larger temperature coefficient. The secondary magnet 12 may be one or more in number and may have a convenient physical dimension. By way of example, Figure 1 shows a pair of annular discs 12a and 12b placed concentrically about the magnet 10 substantially at its midpoint. It is convenient for the material of the secondary magnet 12 to have a large temperature coefficient and high coercive force. By way of example, a suitable material is a magnetically hard ferrite (a well-known magnetic material composed of barium-iron oxide, $BaFe_{12}O_{19}$ having a high crystal anistropy). A sample of this material showed a temperature coefficient of $-15 \times 10^{-4}$ per degree centigrade.

The disc magnets 12a and 12b are permanently magnetized axially by well-known procedures prior to assembly. The secondary magnet 12 is assembled with the primary magnet 10 in such a way that their fields are in opposition. As shown in Figure 1 the upper end of magnet 10 is a north pole, whereas the upper end of each of magnets 12a and 12b is a south pole. For convenient mechanical assembly the secondary magnet 12 may be spaced a short distance from the primary magnet 10 by the annular space 13. The magnets may be held in a fixed configuration by means of an appropriate mechanical support or clamp (not shown).

It is apparent that the primary magnet 10 and secondary magnet 12 produce opposing fields at a distance. However, the primary magnet 10 being substantially stronger permits the magnet system to have a net resultant field at the distant point. Inasmuch as the temperature coefficients of the two magnets differ, it is possible to achieve at the distant point exactly opposite and therefore compensating effects due to temperature changes. This is more clearly illustrated in Figure 2, wherein curve C—D shows the variation in field of the secondary magnet 12 when the temperature changes from O to P. The change in field from $H_3$ to $H_4$ represents the variation of magnetic field of the secondary magnet 12. Inasmuch as the magnet 12 is oppositely directed to the magnet 10, its field $H_3$ is plotted on the opposite side, i.e. below the axis. When observed at the distant point, the change in field of the secondary magnet 12 from $H_3$ to $H_4$ is in the opposite direction to the change of field from $H_1$ to $H_2$ of magnet 10, and in fact may be made to exactly counterbalance the variation in field of the magnet 10. The resultant effect of curves A—B and C—D may be obtained by subtracting the respective fields due to the respective magnets and this is shown by the curve E—F. When the slope of the curve C—D is chosen to be equal and opposite to the slope A—B, the resultant curve E—F represents a value of field $H_0$ which is independent of temperature. The condition that the resultant field of the permanent magnet system be independent of temperature as represented by the zero slope in the line E—F depends on proper proportioning of the two magnets 10 and 12 so that their fields change with temperature in equal and opposite directions. For example, if the secondary magnet 12 has, at a distant point, five times the temperature coefficient of the primary magnet 10, then the secondary magnet need be only one-fifth as strong as the primary magnet. Magnet strength in this case is measured by the field produced at the distant point. Although both magnets have negative temperature coefficients, their changes subtract because their total effects also subtract. It is of course necessary that the magnets be of different strength as well as different temperature coefficients in order that the residual effect of the system at a distance shall be a field of usable magnitude. It is further desirable that the two temperature coefficients be as different as possible and the coefficient of the principal magnet be as low as possible so that the net field strength will be a large fraction of the primary magnet strength.

The field of a bar magnet at a distant point on the line of its axis is given by $H=2M/r^3$ where M is the magnetic moment of the magnet and r is the distance of the point from the mid point of the magnet. If M varies with temperature $M_1=M_{01}(1+a_1 t)$ for the primary magnet, where $a_1$ is its temperature coefficient and $M_1$ and $M_{01}$ are respectively its magnetic moment at temperature $t$ and at zero temperature. Similarly for the secondary magnet $M_2=M_{02}(1+a_2 t)$. If the magnets are opposed, then the resultant magnetic moment is $$M=M_1-M_2=M_{01}-M_{02}+(M_{01}a_1-M_{02}a_2)t$$

and the resultant temperature coefficient is $$(M_{01}a_1-M_{02}a_2)$$

It is apparent that the latter quantity may be made to have any desired value less than that of either of the magnets. In case a zero temperature coefficient is desired, then $M_{01}a_1$ is made equal to $M_{02}a_2$.

In order to attain substantially complete compensation for temperature variations at a distant point it is necessary that the product of the magnetic moment by the temperature coefficient of the magnets 10 and 12 be equal. Inasmuch as the fields of magnets 10 and 12 are opposed, the resultant effective field is proportional to the difference of their magnetic moments, and is independent of temperature. The correct magnetic moment for secondary magnet 12 to be associated with any particular primary magnet 10 is easily determined by experiment. The use of ferrite washers such as 12a and 12b is convenient inasmuch as these may be obtained in various thicknesses and can be individually calibrated and then combined into a single magnet 12 to give the proper magnetic moment for substantially complete temperature compensation. It is apparent that a wide variety of arrangements of these washers such as 12a and 12b may be devised, the only criterion being that the net magnetic moment of this combination forming secondary magnet 12 be related to the temperature coefficient as stated above.

While other magnetic materials may be employed for the secondary magnet 12, the ferrite material is particularly advantageous because of its high coercive force of about 1600 oersteds, which precludes demagnetization by the associated stronger primary magnet 10. Tests have shown that there is little if any interaction between the two magnets when Alnico and ferrite are used as shown in Figure 1. This permits each magnet's effect to be measured separately and the computed difference will closely approximate the resultant effect. Ferrite is also a desirable material because it has a high temperature coefficient which is desirable as mentioned above.

Figure 3 shows an alternative arrangement of the primary and secondary magnets. In Figure 3 the primary magnet 20 is surrounded by a tubular secondary magnet 22 which is magnetized in opposition to magnet 20. The magnets 20 and 22 may have an annular space 24 between them. Secondary magnet 22 has a smaller magnetic moment than primary magnet 20 and the material of magnet 22 has a higher temperature coefficient. The magnets 20 and 22 may be of equal or unequal length. It is also apparent that the functions of magnets 20 and 22 as primary and secondary magnets may be interchanged in Figure 2. The magnets are of course held in a fixed configuration by means of mechanical supports or clamps (not shown).

Figure 4 shows another embodiment of the invention in which the magnet system is made of a bundle of permanently-magnetized wires. The primary magnet in this embodiment comprises one set of wires 30 made of a first material. The secondary magnet comprises another set of wires 32 made of a second material. In order that the secondary magnet have a smaller magnetic moment, the second material may be weaker, or there may be fewer wires in the second set, or the secondary magnet wires may be shorter than those forming the primary magnet. The second material also has a higher temperature coefficient than the first material. The individual wires may have a layer of non-magnetic material (not shown in Figure 4) around their cylindrical surface to keep them out of contact. The two sets of wires are bundled to form the compound magnet and they may be held together with a non-magnetic clamp (not shown) or embedded in plastic (not shown). This embodiment has the advantage that the overall temperature coefficient may easily be adjusted by appropriately adding or subtracting wires of primary or secondary magnet material.

It is apparent that the configuration of primary and secondary magnets shown in Figures 1, 3 and 4 are symmetrical about the polar (longitudinal) axis and also symmetrical about the median transverse plane. Such symmetry is preferred because it results in the fields of the primary and secondary magnets being of almost the same form at a reasonable distance so that the desired temperature compensation is maintained over a substantial region of space. This characteristic allows the compound magnet system to be moved or adjusted in position without destroying the degree of temperature compensation. However, unsymmetrical configurations may be used if desired.

It is also apparent that one or both of the magnets (primary and secondary) may be made up of a number of separate magnets placed end to end either in contact or slightly spaced. Thus in Figure 2 the individual ferrite washers 12a and 12b (together forming the secondary magnet 12) may be spaced apart, and such an arrangement permits making the field patterns of the two magnets (primary and secondary) coincide more precisely at points closer to the magnet system as well as at a distance.

It is further possible with this invention to obtain a magnet system which will be overcompensated or undercompensated for temperature variations. In this manner it is possible to have the magnet system not only compensate for its own temperature coefficient but also compensate for temperature coefficient which lie in other parts of the apparatus. It is apparent that any desired temperature coefficient within a wide range may be obtained by proper proportioning of magnets 10 and 12.

In the appended claims the terms first magnet and second magnet are meant to refer to the primary and secondary magnets herein described, and the configuration of either one of them may comprise a single magnet or a plurality of magnets either spatially separated or in contact.

What I claim as my invention is:

1. A compound permanent magnet having controlled temperature coefficient of field at a distant point comprising a first permanent magnet having a temperature coefficient, a second permanent magnet of strength different from that of said first magnet and having a different temperature coefficient of like sign, support means holding said magnets in a fixed configuration with respect to each other and the distant point, said first and second magnets being arranged magnetically in opposition whereby the resultant magnetic field of said magnets at the distant point is the difference between the respective fields of said magnets.

2. A compound permanent magnet having controlled temperature coefficient of magnetic moment which comprises a first permanent magnet having a first magnetic moment and first temperature coefficient of magnetic moment, a second permanent magnet having a second magnetic moment different from that of said first magnet and having a second temperature coefficient of magnetic moment different from that of said first magnet, support means holding said magnets in a fixed configuration with respect to each other and the distant point, said magnets being arranged magnetically in opposition to deliver opposing fields at a point of interest, whereby there is produced a resultant field proportional to the difference between said first magnetic moment and said second magnetic moment and a temperature coefficient proportional to the quantity consisting of the product of the first magnetic moment by the first temperature coefficient minus the product of the second magnetic moment by the second temperature coefficient.

3. A compound permanent magnet of claim 2 in which said first magnet is in the form of a bar magnet and said second magnet is in the form of an axially-magnetized annulus surrounding said first magnet.

4. A compound permanent magnet of claim 2 in which said first magnet is in the form of a bar magnet and said second magnet is in the form of an axially-magnetized tube surrounding said first magnet.

5. A compound permanent magnet of claim 2 in which said first magnet is in the form of a plurality of bar magnets and said second magnet is in the form of a plurality of bar magnets, said first and said second individual bar magnets being substantially uniformly interminged to form a common bundle.

6. A compound permanent magnet of claim 2 in which said first magnet is made of Alnico and said second magnet is made of ferrite.

7. A compound permanent magnet of claim 2 in which said first magnet has a configuration symmetrically arranged about a polar axis.

8. A compound permanent magnet of claim 2 in which said second magnet has a configuration symmetrically arranged about a polar axis.

9. A compound permanent magnet of claim 2 in which said first magnet has a configuration symmetrically arranged about a plane transverse to the polar axis.

10. A compound permanent magnet of claim 2 in which said second magnet has a configuration symmetrically arranged about a plane transverse to the polar axis.

11. A permanent magnet structure having controlled temperature coefficient of magnetic field at a region of flux utilization in a magnetic flux path external to said structure which comprises a first permanent magnet of a first material, a second permanent magnet of different strength and of a second material, said materials having temperature coefficients of magnetomotive effect which are of the same sign but of different magnitude, means holding said magnets in a fixed configuration with respect to each other and the region of flux utilization, said magnets being disposed to have flux paths magnetically in parallel with respect to the magnetic flux path external to said magnets, and said first and second permanent magnets being directed to have opposing magnetomotive effects with respect to the magnetic flux path external to said magnets.

12. A permanent magnet structure of claim 11 in which said first magnet is in the form of a longitudinally-magnetized elongate member and said second magnet is in the form of an axially-magnetized ring encircling the long axis of said first magnet.

13. A permanent magnet structure of claim 11 in which said first magnet is in the form of a longitudinally-magnetized elongate member of a metallic iron alloy and said second magnet is in the form of an axially-magnetized ring of ferrite encircling the long axis of said first magnet.

References Cited in the file of this patent

UNITED STATES PATENTS

| | | |
|---|---|---|
| 1,530,323 | Pratt | Mar. 17, 1925 |
| 2,536,824 | Sontheim | Jan. 2, 1951 |
| 2,560,260 | Sturtevant et al. | July 10, 1951 |